United States Patent [19]

Idota

[11] Patent Number: 5,260,148
[45] Date of Patent: Nov. 9, 1993

[54] LITHIUM SECONDARY BATTERY
[75] Inventor: Yoshio Idota, Kanagawa, Japan
[73] Assignee: Fuji Photo Film Co., Ltd., Kanagawa, Japan
[21] Appl. No.: 889,137
[22] Filed: May 27, 1992
[30] Foreign Application Priority Data May 27, 1991 [JP] Japan .................................. 3-121281

[51] Int. Cl.$^5$ ............................................ H01M 10/40
[52] U.S. Cl. ...................................... 429/198; 429/218
[58] Field of Search ........................ 429/194, 198, 218

[56] References Cited

U.S. PATENT DOCUMENTS

| | | | |
|---|---|---|---|
| 4,548,881 | 10/1985 | Nalewajek et al. ................. | 429/194 |
| 4,844,993 | 7/1989 | Chang et al. .................... | 429/218 X |
| 5,035,963 | 7/1991 | Plichta et al. .................... | 429/218 X |
| 5,154,990 | 10/1992 | Plichta et al. .................... | 429/218 X |

Primary Examiner—Stephen Kalafut
Attorney, Agent, or Firm—Sughrue, Mion, Zinn, Macpeak & Seas

[57] ABSTRACT

A lithium secondary battery comprising an anode active material, an organic electrolytic solution containing an electrolyte, and a cathode active material, wherein the anode active material contains a lithium compound substantially insoluble in the organic electrolytic solution and represented by formula $$(Li)_p X \qquad (I)$$

wherein X is an anion consisting of an atom or atoms and p indicates the anionic valence of X, the electrolyte contains a compound represented by formula (II):

$$(A)_q (Y)_r \qquad (II)$$

wherein A represents a cation consisting of an atom or atoms, Y represents an anion which may be identical with or different from X in formula (I) provided that the lithium salt of Y is a compound substantially insoluble in the organic electrolytic solution, q=[(anionic valence of Y)×r]/(cationic valence of A), and r=[(cationic valence of A)×q]/(anionic valence of Y), and the cathode active material contains an anion-doped compound or a compound containing a cation which is the same as A in formula (II).

11 Claims, 1 Drawing Sheet

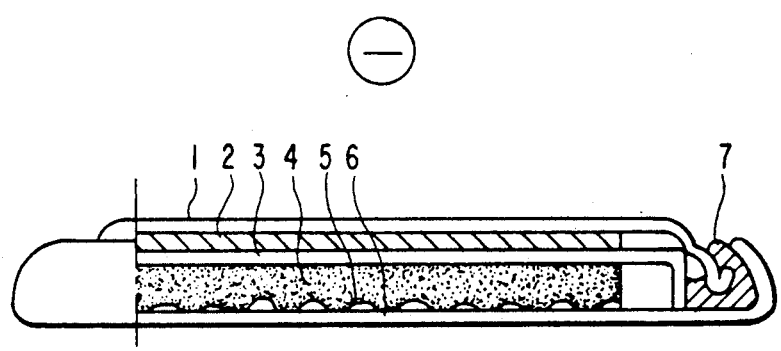

LITHIUM SECONDARY BATTERY

FIELD OF THE INVENTION

The present invention relates to a secondary battery which has improved charge-discharge characteristics and safety.

BACKGROUND OF THE INVENTION

A lithium secondary battery, which basically employs lithium metal as the anode (negative-electrode) active material, develops highly-active arborescent lithium metal (dendrite) or mossy lithium metal (moss) during charge when the battery is repeatedly charged and discharged. There are cases where this dendrite or moss directly or indirectly, after falling from the anode (negative electrode), comes into contact with the cathode (positive-electrode) active material to cause an internal short-circuit. In this respect, lithium secondary batteries are fraught with an exceedingly serious danger. Although use of a lithium alloy with Al, Al-Mn (U.S. Pat. No. 4,820,59), Al-Mg (JP-A-57-98977), Al-Sn (JP-A-63-6742), Al-In, or Al-Cd (JP-A-1-144573) has been proposed as a measure for avoiding the occurrence of such a short-circuit, this is not an complete solution to the problem because lithium metal is still being employed. (The term "JP-A" as used herein means an "unexamined published Japanese patent application".) As an expedient in which lithium metal is not used, use of a calcined carbonaceous compound capable of intercalating and/or deintercalating lithium ions or lithium metal (e.g., JP-A-58-209864, JP-A-61-214417, JP-A-62-88269, JP-A-62-216170, JP-JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, and JP-A-1-274360) has been proposed. However, such a battery disadvantageously has a reduced charge-discharge capacity because the carbonaceous compound employed therein does not directly take part in the charge and discharge reactions. Moreover, high-speed charging and discharging of these batteries is difficult, and the above expedient is not a complete solution to overdischarge, overcharge and safety concerns. A further defect of the battery employing such a calcined carbonaceous compound is that complete dehydration of the compound in battery fabricating is difficult because of the extremely large surface area of the compound. Hence, a further improvement is desired.

In "Batteries", edited by Shiroh Yoshizawa, published by Kodansha Scientific, Japan (1986), p. 148, a battery example is described which employs Li/Li$_2$SO$_4$ as a negative electrode and bis(tetrabutylammonium) sulfate as an electrolyte. Essentially, it is disclosed therein that this battery contains two electrolytic solutions, and that the two electrolytic solutions should be prevented from mingling with each other, indicating that this battery is difficult to realize.

In the field of secondary batteries employing an organic electrolytic solution, incorporation of halide ions, sulfuric acid ions, carbonic acid ions, or the like in an electrolytic solution is disclosed, for example, in JP-A-60-249265 (bromine ions and/or iodine ions), JP-A-63-76274 (alkali metal fluoride ions), JP-A-2-114464 (alkali metal halide or other halide), JP-A-63-198295 (lithium sulfate), JP-A-1-286263 (lithium carbonate), and JP-A-63-313467 (lithium carbonate and calcium hydroxide). However, the batteries disclosed therein all employ a light metal, lithium metal, or a lithium alloy as the anode active material. Use of inorganic solid electrolytes including lithium halides and the like are disclosed in U.S. Pat. No. 3,615,828 and many others. However, none of the above references teach or suggest the novel construction and effects of the present invention.

Further, incorporation of a quaternary salt in an electrolytic solution (e.g., JP-A-49-10527 and JP-A-2-281572) has been disclosed. However, none of these references teach or suggest the novel construction and effects of the present invention.

SUMMARY OF THE INVENTION

An object of the present invention is to provide a lithium secondary battery which not only has a large charge-discharge capacity but shows safe and good charge-discharge cycle characteristics due to the specific anode active material, electrolyte, and cathode active material employed therein.

The above and other objects of the present invention are accomplished by a lithium secondary battery comprising an anode active material, an organic electrolytic solution containing an electrolyte, and a cathode active material, wherein the anode active material contains a lithium compound substantially insoluble in the organic electrolytic solution and represented by formula (I)

$$(Li)_pX \tag{I}$$

wherein X is an anion consisting of an atom or atoms and p indicates the anionic valence of X, the electrolyte contains a compound represented by formula (II):

$$(A)_q(Y)_r \tag{II}$$

wherein A represents a cation consisting Of an atom or atoms, Y represents an anion which may be the same as or different from X in formula (I) provided that the lithium salt of Y is a compound substantially insoluble in the organic electrolytic solution, and q=[(anionic valence of Y)×r]/(cationic valence of A), r=[(cationic valence of A)×q]/(anionic valence of Y), and the cathode active material contains an anion-doped type compound or a compound containing a cation which is the same as A in formula (II).

BRIEF DESCRIPTION OF THE DRAWING

The FIGURE is a sectional view illustrating the coin-type battery fabricated in the Examples.

DETAILED DESCRIPTION OF THE INVENTION

The anode active material employed in the lithium secondary battery of the present invention is not particularly limited as long as the active material is not solely lithium metal or a lithium alloy but rather is a lithium compound which is substantially insoluble in the electrolytic solution to be used. Examples of suitable lithium compounds include inorganic lithium salts such as lithium halides (such as lithium fluoride, lithium chloride, lithium bromide, and lithium iodide); lithium sulfate; lithium carbonate; lithium phosphate; lithium nitrate; lithium silicate; and lithium oxalate. Of these, lithium halides, lithium carbonate, and lithium sulfate are preferred, with lithium fluoride, lithium chloride, and lithium bromide being particularly preferred. It is also possible to employ a mixture of two or more of these compounds as the anode active material. Further, the anode active material may be used in combination with a lithium metal or a lithium alloy (e.g., well known alloys with aluminum, magnesium, manganese, tin, silver, lead, indium, cadmium, and the like). In this case, for example, the above-described anode active material which has undergone press shaping may be press-bonded onto lithium metal or a lithium alloy.

In the present invention, the term "substantially insoluble" means that the amount of the anode active material or the lithium salt of Y that can be dissolved in the organic electrolytic solution containing the electrolyte is preferably 0.1 mol/l or less, more preferably 0.01 mol/l or less, and most preferably in the range of from 0.01 to $1 \times 10^{-6}$ mol/l, at approximately 25° C.

It is preferable that the ratio of the equivalent amount of the anode active material to that of the cathode active material be larger than 1 (i.e., the amount of the anode active material is more than equivalent to the cathode active material). The ratio thereof is more preferably from 1.1 to 5, most preferably from 1.1 to 3.5.

The anode active material described above may be mixed with ordinarily employed ingredients such as an electrically conductive material, binder, reinforcing agent, and the like to give an anode material mixture.

Examples of the electrically conductive material include carbon blacks such as acetylene black and Ketjen Black, graphite, calcined carbonaceous materials containing a graphite structure, silver (JP-A-63-148554), and polyphenylene derivatives (JP-A-59-20971). Of these, acetylene black and calcined carbonaceous materials are especially preferred. The amount of the electrically conductive material used is not particularly limited as long as it enables the negative electrode to exhibit the necessary electrical conductivity. However, the amount thereof is preferably from 0.5 to 25% by weight, more preferably from 3 to 20% by weight, and most preferably from 5 to 15% by weight, based on the amount of the anode material mixture.

With respect to the use of calcined carbonaceous material in the present invention, its purpose and amount used are clearly different from those in the above-enumerated prior art references because, in the present invention, the material is employed only for the purpose of imparting electrical conductivity to the negative electrode.

Representative examples of the binder include natural polysaccharides, synthetic polysaccharides, synthetic polyhydroxy compounds, synthetic poly(acrylic acid) compounds, and fluorine-containing compounds. Of these examples, starch, carboxymethyl cellulose, diacetyl cellulose, hydroxypropyl cellulose, ethylene glycol, poly(acrylic acid), polytetrafluoroethylene, poly(vinylidene fluoride), and the like are preferred.

The reinforcing agent may be a fibrous material which is not reactive with lithium. Preferred examples of the reinforcing agent include fibers of synthetic polymers, such as polypropylene, polyethylene, and Teflon, and carbon fibers. Such fibrous materials preferably have a fiber length of from 0.1 to 4 mm and a fineness of from 0.1 to 50 deniers, with the particularly preferred range of fiber length being from 1 to 3 mm and the fineness being from 1 to 6 deniers.

In the case where a coin-type or button-type battery is to be fabricated, the anode material mixture may be used after being pressed into a pellet. Where the anode material mixture is used in fabricating a cylindrical battery, a sheet-form electrode may be first prepared, for example, by coating the mixture on a current collector, followed by rolling, or by superposing a press-formed sheet of the mixture on a current collector, followed by rolling, and the sheet-form electrode is then rolled up and used for battery fabrication.

The electrolyte employed in the battery of the present invention contains a compound represented by the following formula (II):

$$(A)_q(Y)_r \qquad (II)$$

wherein A represents a cation consisting of an atom or atoms, Y represents an anion which may be identical with or different from X in formula (I) provided that the lithium salt of Y is a compound substantially insoluble in the organic electrolytic solution, $q=[(\text{anionic valence of Y}) \times r]/(\text{cationic valence of A})$, and $r=[(\text{cationic valence of A}) \times q]/(\text{anionic valence of Y})$.

Although symbol A may be a cation derived from either an inorganic or organic compound, it preferably is an organic compound-derived cation, especially an onium cation. Particularly preferred oniums are tetraalkylammoniums in which each alkyl has from 2 to 7 carbon atoms, tetraalkylphosphoniums in which each alkyl has from 2 to 7 carbon atoms, tetraarylammoniums which have from 24 to 30 carbon atoms and which may be substituted, tetraarylphosphoniums which have from 24 to 30 carbon atoms and may be substituted, trialkyloxoniums in which each alkyl has from 2 to 7 carbon atoms, trialkyloxoniums in which each alkyl has from 3 to 10 carbon atoms and which may be substituted, and oniums derived from nitrogen-containing, saturated or unsaturated cyclic compounds which may be substituted, e.g., N-alkylpyridiniums which may be substituted and in which the alkyl has from 1 to 6 carbon atoms, N-alkoxypyridiniums which may be substituted and in which the alkoxy has from 1 to 6 carbon atoms, N-arylpyridiniums which may be substituted and in which the aryl has from 6 to 15 carbon atoms, N-alkylpicoliniums which may be substituted and in which the alkyl has from 1 to 6 carbon atoms, N-alkoxypicoliniums which may be substituted and in which the alkoxy has from 1 to 6 carbon atoms, N-arylpicoliniums which may be substituted and in which the aryl has from 6 to 15 carbon atoms, N-alkylpiperaziniums which may be substituted and in which the alkyl has from 1 to 6 carbon atoms, N-alkylquinoliums which may be substituted and in which the alkyl has from 1 to 6 carbon atoms, and N-alkylquinaldiums which may be substituted and in which the alkyl has from 1 to 6 carbon atoms. Preferred substituents on these cations include alkyl groups, substituted alkyl groups, alkoxy groups, substituted alkoxy groups, and ester groups, each having from 1 to 6 carbon atoms.

In the case where A is an inorganic compound-derived cation, the cation is selected from alkali metals and alkaline earth metals. Of these, lithium and calcium are especially preferred. Where A is lithium, the electrolyte is preferably based on a combination of the lithium compound and an inorganic lithium solid electrolyte. Further, lithium may be used therewith in such an amount that it dissolves slightly. In formula (II), Y is an anion which may be either identical with, or different from, X in formula (I).

The electrolyte may contain either an ordinarily employed anion, such as $ClO_4^{-}$, $BF_4^-$, $AsF_6^-$, $PF_6^-$, $SbF_6^-$, $CF_3SO_3^-$, $CF_3CO_2^-$, $B_{10}Cl_{10}^-$, etc. and as the cation, a lithium ion or a compound of A in formula (II), in an amount up to 50% by mol with respect to an amount of the organic electrolytic solution.

Although effective concentrations of the electrolyte in the electrolytic solution are in the range of from 0.2 mol/l to the saturation concentration, the electrolyte concentration is preferably from 0.3 to 4.0 mol/l, more preferably from 0.5 to 3.0 mol/l.

The solvent in the electrolytic solution may be a non-protonic organic solvent or a mixture of two or more non-protonic organic solvents. Examples of such solvents include propylene carbonate, ethylene carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, phosphoric triesters (JP-A-60-23973), trimethoxymethane (JP-A-61-4170), dioxolane derivatives (JP-A-62-15771, JP-A-62-22372, and JP-A-62-108474), sulfolane (JP-A-62-31959), 3-methyl-2-oxazolidinone (JP-A-62-44961), propylene carbonate derivatives (JP-A-62-290069 and JP-A-62-290071), tetrahydrofuran derivatives (JP-A-63-32872), ethyl ether (JP-A-63-62166), 1,3-propane sultone (JP-A-63-102173), and the like.

Along with the electrolytic solution, a solid electrolyte may be used which can be inorganic or organic.

Well known inorganic solid electrolytes are nitrides, halides, and oxyacid salts of Li and similar compounds of Li. Of these, $Li_3N$, LiI, $Li_5NI_2$, $Li_3N$-LiI-LiOH, $Li_2SiO_4$, $LiSiO_4$-LiI-LiOH (JP-A-49-81899), $xLi_3PO_4$-$(1-x)Li_4SiO_4$ (JP-A-59-60866), $Li_2SiS_3$ (JP-A-60-501731), phosphorus sulfide compounds (JP-A-62-82665), and the like are especially useful.

Useful organic solid electrolytes include a poly(ethylene oxide derivative) or a polymer containing such a derivative (JP-A-63-135447), a poly(propylene oxide derivative) or a polymer containing such a derivative, polymers containing an ionizable group (JP-A-62-254302, JP-A-62-254303, and JP-A-63-193954), mixtures of a polymer containing an ionizable group and such a non-protonic electrolytic solution as those described above (U.S. Pat. Nos. 4,792,504 and 4,830,939, JP-A-62-22375, JP-A-62-22376, JP-A-63-22375, JP-A-63-22776, and JP-A-1-95117), and phosphate polymers (JP-A-61-256573).

An electrolytic solution to which polyacrylonitrile has been added may also be used (JP-A-62-278774). Further, combined use of an inorganic solid electrolyte and an organic solid electrolyte is also known (JP-A-60-1768).

The cathode active material may comprise either an inorganic compound or an organic compound.

The inorganic compound to be used as, or in, the cathode active material may be a compound obtained by incorporating A of formula (II) into a transition metal chalcogenide. Specific examples of the transition metal chalcogenide include $Mn_2O_4$, $Mn_2O_3$, $CoO_2$, $Co_xMn_{1-x}O_y$, $Ni_xCo_{1-x}O_y$, $V_xMn_{1-x}O_y$, $Fe_xMn_{1-x}O_y$, $V_2O_5$, $V_3O_8$, $V_6O_{13}$, $Co_xV_{1-x}O_y$, $MoS_2$, $MoO_3$, $TiS_2$, and the like, with x being from 0.1 to 0.85 and y being from 2 to 3.

For incorporating a cation (A in formula (II)) into a reductant (anion) of a transition metal chalcogenide, methods in which i) a compound containing the cation is mixed with the reductant and the mixture is calcined, and ii) an ion-exchange method are mainly used. In the calcination method, the compound containing A preferably is one which melts. In the case where the compound containing A is an onium compound, it preferably is a compound having an aromatic or heterocyclic ring such as pyridinium or picolinium. In the case where the compound containing A is an inorganic compound, A preferably is calcium. Although the transition metal chalcogenide may be synthesized by a well known method, it is particularly preferable that the calcination be conducted in air or in an inert gas atmosphere at a temperature of from 200° to 1,500° C.

The organic compound to be used as, or in, the cathode active material may be either an anion-doped type or cation-doped type compound, both of which are well known.

The cation-doped type cathode active material may be obtained by incorporating a cation (A of formula (II)) into such a compound as, for example, a polyacene derivative (e.g., JP-A-58-209864), a hydroquinone derivative, an S-S compound as a liquid cathode active material, or the like. The cation can be incorporated by a synthetic method or the same methods as those for the above-described transition metal chalcogenide-based cathode active material. Of these, a synthetic method and ion-exchange method are preferred.

The anion-doped type cathode active material may be selected from polyaniline derivatives (e.g., Molecular Crystal and Liquid Crystal, Vol. 121, 173 (1985), JP-A-60-197728, JP-A-63-46223, JP-A-63-243131, and JP-A-2-219823), polypyrrole derivatives (e.g., Journal of Chemical Society Chemical Communication, 854 (1979), DE 3,223,544A, DE 3,307,954A, JP-A-62-225517, JP-A-63-69824, and JP-A-1-170615), polythiophene derivatives (e.g., JP-A-58-187432 and JP-B-1-12775) (the term "JP-B" as used herein means an "examined Japanese patent publication"), polyacene derivatives (e.g., JP-A-58-209864), poly-p-phenylene derivatives, and the like. These derivatives include copolymers.

The above-enumerated polymeric electrode materials may be produced by well known polymerization methods. Of these, an oxidative polymerization method and electrolytic polymerization method are preferred.

In the case where an anion-doped type cathode active material such as those mentioned above is used in fabricating a battery, it is preferably used in the form of a reductant thereof. For converting the cathode active material into its reductant, an electrolytic reduction method or chemical reduction method may be used, with the chemical reduction method employing a hydrazine compound being preferred.

Part of the above-enumerated organic polymers are described in detail in "Conductive Polymers", edited by Naoya Ogata, published by Kodansha Scientific (1990).

The battery of the present invention exhibits high performances where an anion-doped type cathode active material is employed. If a battery employs ordinary lithium metal or its alloy as the anode active material, the electrolytic solution should contain a large quantity of an anion with which the cathode active material is to be doped, in order to enable the battery to have a large electrical capacity. Practically, however, a large anion quantity is attained by increasing the amount of the electrolytic solution because an increase in electrolyte concentration causes the ionic conductance of the electrolytic solution to decrease, and this has prevented coin-type, button-type, or cylindrical batteries, which have limited volume capacities, from having a large electrical capacity.

Further, since the anion to be doped, which is derived from a compound soluble in the electrolytic solution, disadvantageously has an extremely large ionic radius like $ClO_4^-$, $BF_4^-$, $AsF_6^-$, $PF_6^-$, $SbF_6^-$, $CF_3SO_3^-$, $CF_3CO_2^-$, and $B_{10}Cl_{10}^-$, the doping degree is low (electrical capacity is small), and because doping proceeds too slowly, high-speed charging and discharging is extremely difficult.

In contrast, in the battery of the present invention, since the anode active material contains an anion in an amount necessary for doping, there is no need to add a doping-use electrolyte to the electrolytic solution and, hence, an electrolyte concentration, which makes the ionic conductance the highest, can be selected. Because of this, and because an anion having a small ionic radius can be selected, the lithium secondary battery of the present invention can have a high capacity and is suitable for rapid charging and discharging.

A cathode material mixture may be prepared from the cathode active material by mixing it with the same ingredients as those used for preparing the anode material mixture.

By employing the above-described cathode active material, a safe lithium secondary battery according to the present invention can be produced which has a simple construction and is free from the drawbacks described in "Batteries" mentioned hereinabove.

A separator, which may be employed in the battery of the present invention, is an insulating thin film having a high ion permeability and a mechanical strength not lower than a prescribed level. As the separator, a polyolefin nonwoven fabric such as a polypropylene nonwoven fabric, glass fibers, or the like may be used from the standpoints of organic solvent resistance and hydrophobicity.

It is known that the compounds enumerated below can be added to electrolytes in order to improve discharge characteristics and charge-discharge characteristics. Exemplary additive compounds include pyridine (JP-A-49-108525), triethyl phosphite (JP-A-47-4376), triethanolamine (JP-A-52-72425), cyclic ethers (JP-A-57-152684), ethylenediamine (JP-A-58-87777), n-glyme (JP-A-58-87778), hexaphosphoric triamide (JP-A-58-87779), nitrobenzene derivatives (JP-A-58-214281), sulfur (JP-A-59-8280), quinoneimine dyes (JP-A-59-68184), an N-substituted oxazolidinone and an N,N'-substituted imidazolidinone (JP-A-59-154778), ethylene glycol dialkyl ethers (JP-A-59-205167), poly(ethylene glycol) (JP-A-60-41773), pyrrole (JP-A-60-79677), 2-methoxyethanol (JP-A-60-89075), $AlCl_3$ (JP-A-61-88466), monomers for conductive-polymer electrode active materials (JP-A-61-161673), triethylenephosphoramide (JP-A-61-208758), trialkylphosphines (JP-A-62-80976), morpholine (JP-A-62-80977), aryl compounds having a carbonyl group (JP-A-62-86673), hexamethylphosphoric triamide and a 4-alkylmorpholine (JP-A-62-217575), bicyclic tertiary amines (JP-A-62-217578), oils (JP-A-62-287580), quaternary phosphonium salts (JP-A-63-121268), tertiary sulfonium salts (JP-A-63-121269), and the like.

It is possible to employ an electrolytic solution in which a halogen-containing solvent such as, for example, carbon tetrachloride or ethylene chloride trifluoride is used in order to make the electrolytic solution non-combustible (JP-A-48-36632).

It is also possible to employ an electrolytic solution in which carbon dixide has been dissolved in order to impart high-temperature storage suitability to the electrolytic solution (JP-A-59-134567).

Each of the cathode active material and anode active material may contain therein an electrolytic solution or an electrolyte. For example, incorporation of the above-described ionically conductive polymers, nitromethane (JP-A-48-36633), or an electrolytic solution (JP-A-57-124870) is known.

Further, the cathode active material may be one which has undergone surface modification. For example, surface modification may be conducted by treating the surface of a metal oxide to be used as the active material with an esterifying agent (JP-A-55-163779), a chelating agent (JP-A-55-163780), an electrically conductive polymer (JP-A-58-163188 and JP-A-59-14274), or poly(ethylene oxide) or the like (JP-A-60-97561).

The anode active material also may be one which has undergone surface modification. Examples of surface modifications include the formation of a layer of an ionically conductive polymer or polyacetylene (JP-A-58-111276), treatment with LiCl (JP-A-58-142771), treatment with ethylene carbonate (JP-A-59-31573), and the like.

Examples of the material of the carrier for the cathode active material include, in addition to ordinarily employed stainless steel, nickel, and aluminum, porous foamed metals for electrically conductive polymers (JP-A-59-18578), titanium (JP-A-59-68169), expanded metals (JP-A-61-264686), and punched metals. Examples of the material of the carrier for the anode active material include, in addition to ordinarily employed stainless steel, nickel, titanium, and aluminum, porous nickel (JP-A-58-18883), porous aluminum (JP-A-58-38466), a sintered aluminum mass (JP-A-59-130074), a body made up of aluminum fibers (JP-A-59-148277), silver-plated stainless steel (JP-A-60-41761), calcined carbonaceous materials such as a calcined phenolic resin (JP-A-60-112264), Al-Cd alloys (JP-A-60-211779), porous foamed metals (JP-A-61-74268), and t like.

The material of the current collector is not particularly limited, and any electron conductor may be used as the collector so long as the electron conductor employed will not undergo a chemical change in the battery fabricated, like the electrode carrier. In addition to ordinarily employed stainless steel, titanium, nickel, and the above-enumerated materials that can be used as the carrier, examples of the material of the current collector include nickel-plated copper (JP-A-48-36627), titanium-plated copper, copper-treated stainless steel for cathode active materials of the sulfide type (JP-A-60-175373), and the like.

The configuration of the battery is not limiting, and may be any of coin, button, sheet, and cylindrical types.

As described above, the lithium secondary battery of the present invention, which employs an organic electrolytic solution, is characterized in that the anode active material contains a lithium compound substantially insoluble in the organic electrolytic solution and represented by the following formula (I), the electrolyte contains a compound represented by the following formula (II), and the cathode active material contains an anion-doped type compound or a compound containing a cation which is the same as A in formula (II). Formula (I) is represented by:

wherein X is an anion consisting of an atom or atoms and p indicates the anionic valence of X, and Formula (II) is represented by:

wherein A represents a cation consisting of an atom or atoms, Y represents an anion which may be the same as or different from X in formula (I) provided that the lithium salt of Y is a compound substantially insoluble in the organic electrolytic solution, q=[(anionic valence of Y)×r]/(cationic valence of A), and r=(cationic valence of A)×q]×(anionic valence of Y). Due to these specific components, the lithium secondary battery of the present invention is safe and has a large discharge capacity and excellent charge-discharge cycle characteristics.

The present invention is illustrated in more detail by reference to the following examples, which should not be construed to be limiting the scope of the invention. Unless otherwise indicated all parts, percents, ratios and the like are by weight.

EXAMPLE 1

Negative electrodes (anodes) were prepared by mixing 80 parts by weight of each of (1) LiF, (2) LiCl, (3) LiBr, (4) $Li_2SO_4$, (5) $Li_2CO_3$, (6) $Li_2SO_4$, and (7) LiCl+LiBr (0.8+0.2), as anode active materials, with 12 parts by weight of graphite, 6 parts by weight of polytetrafluoroethylene, and 2 parts by weight of a carbon filler, drying the resulting mixtures at 200° C. for an hour, and then pressing the dry mixtures into pellets (16 mm$\phi$, capacity 30 mAH).

Positive electrodes (cathodes) were prepared by mixing 88 parts by weight of a reductant of each of (1) polypyrrole obtained by chemical oxidation polymerization, (2) polyaniline obtained by chemical oxidation polymerization, (3) polypyrrole obtained by electrolytic polymerization, (4) a copolymer of aniline and Compound 1 specified below (molar ratio=85:15) obtained by chemical oxidation polymerization, and (5) a copolymer of pyrrole and Compound 2 specified below (molar ratio=75:25) obtained by chemical oxidation polymerization, as cathode active materials, with 6 parts by weight of acetylene black and 6 parts by weight of diacetyl cellulose, drying the resulting mixtures at 160° C. for an hour in a nitrogen gas atmosphere, and then pressing the dry mixtures into pellets (15 mm$\phi$, capacity 20 mAH).

Compound 1:

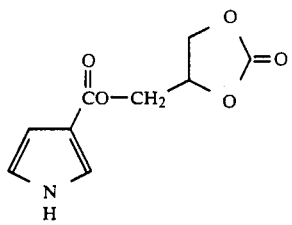

Compound 2:

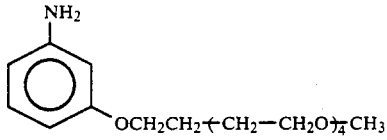

Electrolytic solutions were prepared by adding each of (1) tetrabutylammonium ions, (2) tetrabutylphosphonium ions, (3) tetrapentylammonium ions, (4) N-methylpyridinium ions, and (5) N-methylpicolinium ions, as electrolytes, to a solvent which was an equimolar mixture of propylene carbonate and 1,2-dimethoxyethane, in an amount of 1 mol/l. A further electrolytic solution was prepared by adding (6) both tetraethylammonium ions and tetrabutylammonium ions to the same solvent as the above in amounts of 0.2 mol/l and 0.8 mol/l, respectively. As a separator, a microporous polypropylene nonwoven fabric was used after impregnation with each of the above electrolytic solutions. Using these materials, coin-type lithium batteries as shown in the FIGURE were fabricated. In the FIGURE, numeral 1 denotes a negative electrode cover, 2 a pelleted negative electrode, 3 a separator, 4 a pelleted positive electrode, 5 a current collector, 6 a positive electrode case, and 7 a gasket.

The thus-fabricated lithium batteries were first charged at 0.02 mA for 24 hours, and then subjected to a charge-discharge test at a charge-discharge depth of 2 mA for an hour.

Charge-discharge cycle characteristics were evaluated in terms of the charge-discharge cycle number which is the number of cycles counted before the discharge time had decreased to 42 minutes or less.

A discharge capacity test was also conducted in which each battery was charged sufficiently at 0.2 mA and then discharged at 0.2 mA, and the discharge capacity shown in this discharge was measured.

A safety test was further conducted in which each coin-type battery, after being subjected to 10 charge-discharge cycles, was charged to 100% of the capacity of the cathode active material, subsequently, the battery was disassembled in a dry box, and the negative electrode pellet and the nonwoven fabric were then removed and immersed in 1-liter of water. For each battery, 20 battery samples were thus tested and the safety thereof was evaluated in terms of the number of samples whose negative electrode pellet and nonwoven fabric ignited upon immersion in water.

EXAMPLE 2

Using the same anode active materials as those used in Example 1, negative electrodes were prepared likewise.

Positive electrodes were prepared by mixing 88 parts by weight of each of (6) N-methylpyridinium $Mn_2O_4$, (7) N-methylpicolinium $CoO_2$, (8) N-methylpyridinium $V_2O_5$, and (9) ditetramethylammonium 1,4-benzenediolate polymer, as cathode active materials, with 6 parts by weight of diacetyl cellulose and 6 parts by weight of acetylene black, drying the resulting mixtures at 160° C for an hour, and then pressing the dry mixtures into pellets (15 mm$\phi$, capacity 20 mAH).

The same electrolytic solutions as those in Example 1 were used.

Except for the above, batteries were fabricated and evaluated under the same conditions as in Example 1.

COMPARATIVE EXAMPLE

A negative electrode was prepared from (1) a lithium-aluminum alloy (80:20 by weight, 16 mm$\phi$, capacity 40 mAH) as an anode active material. Another negative electrode was prepared by mixing 88 parts by weight of (2) pitch coke as an anode active material with 12 parts by weight of polytetrafluoroethylene, drying the mixture at 300° C., and then pressing the dry mixture into a pellet (16 mm$\phi$, capacity 20 mAH). Positive electrodes were prepared by mixing 88 parts by weight of each of (1) $LiMn_2O_4$, (2) $LiCoO_2$, (3) $V_2O_5$, (4) polypyrrole obtained by chemical oxidation polymerization, and (5) polyaniline obtained by chemical oxidation polymerization, as cathode active materials, with 6 parts by weight of acetylene black and 6 parts by weight of polytetrafluoroethylene, drying the resulting mixtures, and then compression-molding the dry mixtures into pellets (15 mm$\phi$, capacity 20 mAH). As an electrolyte, LiBF$_4$ was used as a 1-mol/l solution in a solvent (1:1 by volume mixture of propylene carbonate and 1,2-dimethoxyethane). Except for the above, coin-type batteries were fabricated and evaluated under the same conditions as in Example 1.

RESULTS

The results obtained in Example 1, Example 2, and Comparative Example are summarized in Tables 1, 2, and 3, respectively.

TABLE 1

| No. | Cathode | Anode | Electrolyte | Cycle Number (cycles) | Discharge Capacity (mAh) | Safety |
|---|---|---|---|---|---|---|
| 1 | (1) | (1) | fluoride of (1) | 630 | 13 | 0 |
| 2 | (2) | " | " | 550 | 12 | 0 |
| 3 | (3) | " | " | 520 | 13 | 0 |
| 4 | (4) | " | " | 600 | 14 | 0 |
| 5 | (5) | " | " | 840 | 15 | 0 |
| 6 | (1) | (2) | chloride of (1) | 580 | 13 | 0 |
| 7 | (2) | " | " | 560 | 12 | 0 |
| 8 | (3) | " | " | 540 | 13 | 0 |
| 9 | (4) | " | " | 650 | 14 | 0 |
| 10 | (5) | " | " | 850 | 16 | 0 |
| 11 | (5) | (3) | bromide of (1) | 380 | 14 | 0 |
| 12 | " | (4) | phosphate of (1) | 480 | 14 | 0 |
| 13 | " | (5) | carbonate of (1) | 620 | 13 | 0 |
| 14 | " | (6) | sulfate of (1) | 520 | 11 | 0 |
| 15 | " | (7) | chlorobromide of (1) | 750 | 15 | 0 |
| 16 | (5) | (2) | chloride of (2) | 900 | 15 | 0 |
| 17 | " | " | chloride of (3) | 720 | 14 | 0 |
| 18 | " | " | chloride of (4) | 840 | 14 | 0 |
| 19 | " | " | chloride of (5) | 880 | 14 | 0 |
| 20 | " | " | chloride of (6) | 850 | 14 | 0 |

TABLE 2

| No. | Cathode | Anode | Electrolyte | Cycle Number (cycles) | Discharge Capacity (mAh) | Safety |
|---|---|---|---|---|---|---|
| 1 | (6) | (1) | fluoride of (4) | 540 | 11 | 0 |
| 2 | (7) | " | fluoride of (5) | 480 | 10 | 0 |
| 3 | (8) | " | fluoride of (4) | 440 | 10 | 0 |
| 4 | (9) | " | fluoride of (5) | 510 | 12 | 0 |
| 5 | (6) | (2) | chloride of (4) | 520 | 11 | 0 |
| 6 | (7) | " | chloride of (5) | 470 | 11 | 0 |
| 7 | (8) | " | chloride of (4) | 450 | 10 | 0 |
| 8 | (9) | " | chloride of (5) | 580 | 12 | 0 |
| 9 | (6) | (3) | bromide of (4) | 510 | 11 | 0 |
| 10 | " | (4) | phosphate of (4) | 310 | 10 | 0 |
| 11 | " | (5) | carbonate of (4) | 510 | 10 | 0 |
| 12 | " | (6) | sulfate of (4) | 420 | 8 | 0 |
| 13 | " | (7) | chlorobromide of (4) | 550 | 10 | 0 |
| 14 | " | (2) | chloride of (1) | 530 | 11 | 0 |
| 15 | " | " | chloride of (2) | 520 | 9 | 0 |
| 16 | (6) | (2) | chloride of (3) | 500 | 10 | 0 |
| 17 | " | " | chloride of (5) | 450 | 11 | 0 |
| 18 | " | " | chloride of (6) | 430 | 10 | 0 |
| 19 | " | (3) | chloride of (4) | 560 | 10 | 0 |

TABLE 3

| No. | Cathode | Anode (cycles) | Cycle Number (mAh) | Discharge Capacity | Safety |
|---|---|---|---|---|---|
| 1 | (1) | (1) | 810 | 14 | 12 |
| 2 | (2) | " | 780 | 13 | 11 |
| 3 | (3) | " | 880 | 16 | 14 |
| 4 | (4) | " | 550 | 8 | 12 |
| 5 | (5) | " | 580 | 6 | 13 |
| 6 | (1) | (2) | 710 | 11 | 5 |

TABLE 3-continued

| No. | Cathode | Anode (cycles) | Cycle Number (mAh) | Discharge Capacity | Safety |
|---|---|---|---|---|---|
| 7 | (2) | " | 630 | 11 | 6 |
| 8 | (3) | " | 680 | 13 | 4 |
| 9 | (4) | " | 480 | 7 | 6 |
| 10 | (5) | " | 500 | 5 | 5 |

While the invention has been described in detail and with reference to specific embodiments thereof, it will be apparent to one skilled in the art that various changes and modifications can be made therein without departing from the spirit and scope thereof.

What is claimed is:

1. A lithium secondary battery comprising an anode active material, an organic electrolytic solution containing an electrolyte, and a cathode active material, wherein said anode active material contains a lithium compound substantially insoluble in the organic electrolytic solution and represented by formula (I):

$$(Li)_p X \qquad (I)$$

wherein X is an anion consisting of an atom or atoms and p indicates the anionic valence of X, said electrolyte contains a compound represented by formula (II):

$$(A)_q(Y)_r \quad (II)$$

wherein A represents a cation consisting of an atom or atoms, Y represents an anion which may be identical with or different from X in formula (I) provided that the lithium salt of Y is a compound substantially insoluble in the organic electrolytic solution, q=[(anionic valence of Y)×r]/(cationic valence of A), and r=[(cationic valence of A)×q](anionic valence of Y), and said cathode active material contains an anion-doped compound or a compound containing a cation which is the same as A in formula (II).

2. A lithium secondary battery as in claim 1, wherein said anode active material dissolves in said organic electrolytic solution in an amount of from 0.1 mol/l or less at approximately 25° C.

3. A lithium secondary battery as in claim 1, wherein said anode active material dissolves in said organic electrolytic solution in an amount of from 0.01 mol/l or less at approximately 25° C.

4. A lithium secondary battery as in claim 1, wherein said anode active material dissolves in said organic electrolytic solution in an amount of from 0.01 to $1\times10^{-6}$ mol/l at approximately 25° C.

5. A lithium secondary battery as in claim 1, wherein A, in said formula (II), is an onium group.

6. A lithium secondary battery as in claim 1, wherein A, in said formula (II), is an alkali metal.

7. A lithium secondary battery as in claim 6, wherein said alkali metal is lithium.

8. A lithium secondary battery as in claim 1, wherein A, in said formula (II), is an alkaline earth metal.

9. A lithium secondary battery as in claim 8, wherein said alkaline earth metal is calcium.

10. A lithium secondary battery as in claim 1, wherein said electrolyte is present in said organic electrolytic solution in an amount of from 0.3 to 4.0 mol/l.

11. A lithium secondary battery as in claim 1, wherein said electrolyte is present in said organic electrolytic solution in an amount of from 0.5 to 3.0 mol/l.

* * * * *